(12) United States Patent
Li

(10) Patent No.: US 12,332,901 B2
(45) Date of Patent: Jun. 17, 2025

(54) GRAPH DATA QUERY METHOD AND APPARATUS

(71) Applicant: Alipay (Hangzhou) Information Technology Co., Ltd., Zhejiang (CN)

(72) Inventor: Mengyu Li, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/427,116

(22) Filed: Jan. 30, 2024

(65) Prior Publication Data

US 2024/0330302 A1 Oct. 3, 2024

(30) Foreign Application Priority Data

Mar. 31, 2023 (CN) .......................... 202310360054.8

(51) Int. Cl.
*G06F 16/24* (2019.01)
*G06F 16/242* (2019.01)
(Continued)

(52) U.S. Cl.
CPC ...... *G06F 16/2456* (2019.01); *G06F 16/2433* (2019.01); *G06F 16/24526* (2019.01)

(58) Field of Classification Search
CPC ............. G06F 16/2456; G06F 16/2433; G06F 16/24526; G06F 16/9024
See application file for complete search history.

(56) References Cited

U.S. PATENT DOCUMENTS 8,533,182 B1\* 9/2013 Charboneau ...... G06F 16/90335
707/718
2018/0067987 A1 3/2018 Kang et al.
(Continued)

FOREIGN PATENT DOCUMENTS

CN 102693310 A 9/2012
CN 108711136 A 10/2018
(Continued)

OTHER PUBLICATIONS

Chinese Search Report issued in corresponding Chinese Application No. 202310360054.8 (2 pages), May 20, 2023.
(Continued)

*Primary Examiner* — Merilyn P Nguyen
(74) *Attorney, Agent, or Firm* — Finnegan, Henderson, Farabow, Garrett & Dunner, LLP

(57) ABSTRACT

A graph data query method for use in a graph database, includes: receiving and parsing a graph query statement for the graph database, wherein the graph query statement includes a first match pattern for first graph data, a second match pattern for second graph data, a join operation keyword indicating a join type, and a matching condition; determining one or more first matching objects in the first graph data based on the first match pattern, determining one or more second matching objects in the second graph data based on the second match pattern, and determining one or more target matching objects that satisfy the matching condition from the first matching objects and the second matching objects; and determining one or more target query objects corresponding to the graph query statement based on the join type and the target matching objects, thereby performing a graph data query in the graph database.

20 Claims, 6 Drawing Sheets

(51) Int. Cl.
  *G06F 16/2452*  (2019.01)
  *G06F 16/2455*  (2019.01)

(56) References Cited

U.S. PATENT DOCUMENTS

| | | | | |
|---|---|---|---|---|
| 2018/0089331 | A1* | 3/2018 | Long | G06F 16/2455 |
| 2020/0285643 | A1* | 9/2020 | Kadiam | G06F 16/9024 |
| 2022/0083552 | A1* | 3/2022 | Gupta | G06F 16/27 |
| 2022/0245147 | A1* | 8/2022 | Segalini | G06F 16/24552 |
| 2023/0267120 | A1* | 8/2023 | Kapp | G06F 16/28 707/717 |
| 2024/0126764 | A1* | 4/2024 | Haprian | G06F 16/2433 |

FOREIGN PATENT DOCUMENTS

| | | |
|---|---|---|
| CN | 114297443 A | 4/2022 |
| CN | 114417066 A | 4/2022 |
| CN | 115438070 A | 12/2022 |
| CN | 115658711 A | 1/2023 |
| CN | 115858872 A | 3/2023 |

OTHER PUBLICATIONS

Mennicke et al., "Fast Dual Simulation Processing of Graph Database Queries," 2019 IEEE 35th International Conference on Data Engineering (ICDE), pp. 244-255.

Jinxia et al., Algorithm design and implementation for converting SQL query statements into graph structures, School of Information and Statistics, Guangxi University of Finance and Economics, Nanning, Guangxi 530000, pp. 120-123, 2020, machine translation of abstract only.

Yanjie, Liang, "Resarch and Design of Personalized Recommendation System Based on Graph Database," Master's thesis of Chongqing University of Posts and Telecommunications, 2018, 58 pages, translation of abstract only.

* cited by examiner

GRAPH DATA QUERY METHOD AND APPARATUS

CROSS-REFERENCE TO RELATED APPLICATIONS

The present application is based upon and claims priority to Chinese Patent Application No. 202310360054.8, filed on Mar. 31, 2023, the entire content of which is incorporated herein by reference.

TECHNICAL FIELD

Embodiments of the present specification relate to a graph database, and in particular, to a graph data query method and apparatus for performing graph data query.

BACKGROUND

Conventional databases are mostly relational databases, which store data in a form of a table. For the relational database, a structured query language (SQL) can be used to query and operate data in the database. Due to intuitiveness and rich functionality of the SQL language, the SQL language is a widely used query language in the field of database query.

With the development of big data and artificial intelligence, data starts to be recorded and processed in a form of a graph in more scenarios. For example, a user social relation graph is often constructed on a social platform, and a payment relation graph is often constructed on a payment platform. Therefore, for characteristics of graph data, a dedicated graph database is designed to store various graph data. Data of the graph database is stored in a different form from the conventional relational data. Therefore, the SQL language for performing table-based query may not be applied to graph data query. Although some languages and query engines dedicated to graph query already exist, query of the graph database is still a challenging task due to the complexity and high learning costs thereof.

SUMMARY

According to a first aspect, a graph data query method for use in a graph database includes: receiving and parsing a graph query statement for the graph database, where the graph query statement includes a first match pattern for first graph data, a second match pattern for second graph data, a join operation keyword indicating a join type, and a matching condition; determining one or more first matching objects in the first graph data based on the first match pattern, determining one or more second matching objects in the second graph data based on the second match pattern, and determining one or more target matching objects that satisfy the matching condition from the first matching objects and the second matching objects; and determining one or more target query objects corresponding to the graph query statement based on the join type and the target matching objects, thereby performing a graph data query in the graph database.

According to a second aspect, a graph data query apparatus for use in a graph database includes: a processor; and a memory storing instructions executable by the processor. The processor is configured to: receive and parse a graph query statement for the graph database, where the graph query statement includes a first match pattern for first graph data, a second match pattern for second graph data, a join operation keyword indicating a join type, and a matching condition; determine one or more first matching objects in the first graph data based on the first match pattern, determine one or more second matching objects in the second graph data based on the second match pattern, and determine one or more target matching objects that satisfy the matching condition from the first matching objects and the second matching objects; and determine one or more target query objects corresponding to the graph query statement based on the join type and the target matching objects, thereby performing a graph data query in the graph database.

According to a third aspect, a non-transitory computer-readable storage medium has stored thereon instructions that, when executed by a processor, cause the processor to perform the graph data query method according to the first aspect.

In the embodiments of the present specification, the join type is directly indicated by using the join operation keyword in the graph query statement. As such, the graph data query method and apparatus in the present specification support directly specifying a join type for graph data query in a graph database, thereby facilitate performing a join operation and joint query on graph data of a plurality of graphs in the graph database.

BRIEF DESCRIPTION OF DRAWINGS

The following briefly describes the accompanying drawings of the specification. The accompanying drawings in the following description show merely example embodiments, and a person of ordinary skill in the art can derive other embodiments from these accompanying drawings.

DETAILED DESCRIPTION OF EMBODIMENTS

Reference will now be made in detail to embodiments, examples of which are illustrated in the accompanying drawings. The following description refers to the accompanying drawings in which the same numbers in different drawings represent the same or similar elements unless otherwise represented. The described embodiments are merely examples of rather than all the embodiments of the present application.

As described above, an SQL language is widely used in data query in relational databases. During data query, it is often necessary to perform joint query on data of a plurality of tables. This can be implemented by using a join operation in the SQL. The SQL provides a plurality of join operation methods, including inner join, left join, right join, full outer join, etc.

Figure 1:
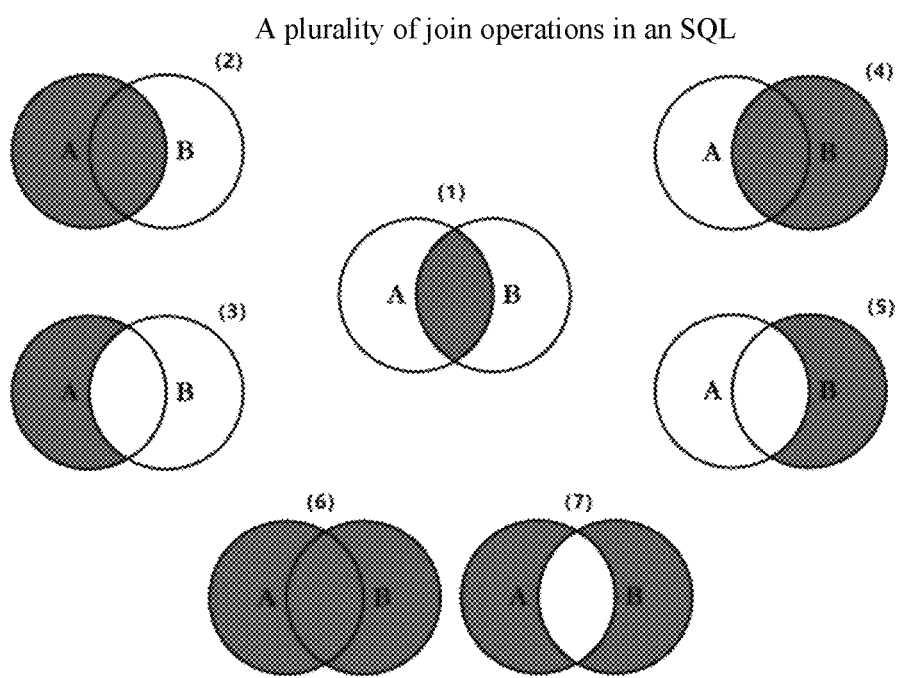
FIG. 1 is a schematic diagram illustrating a plurality of join operations in an SQL, according to some embodiments.

FIG. 1 is a schematic diagram illustrating a plurality of join operations in an SQL, according to some embodiments. The middle part (1) in FIG. 1 is inner join, which is a default join method. When key values in, e.g., table A and table B, being the same is used as a join condition, data rows with equal key values in table A and table B can be returned by performing inner join on table A and table B, in other words, an intersection of table A and table B is obtained. A form of an SQL statement that implements the operation is as follows:

SELECT<select_list>
FROM TableA
INNER JOIN TableB
ON A.Key=B.Key

Part (2) in FIG. 1 shows left join. When an SQL statement specifies that left join is to be performed on table A and table B, a returned result is all rows of table A. A data row whose key value is equal to that in table B includes a field value of a target field to be queried in table B, and a data row that is not matched with table B (having unequal keys) is shown by null in the target field. A form of the SQL statement that implements the operation is as follows:

SELECT<select_list>
FROM TableA
LEFT JOIN TableB
ON A.Key=B.Key

Part (3) in FIG. 1 shows left join that rules out the intersection. A target field of table B being null is added to the match condition to obtain data rows in table A whose key values are different from those in table B. A form of an SQL statement that implements the operation is as follows:

SELECT<select_list>
FROM TableA
LEFT JOIN TableB
ON A.Key=B.Key
WHERE B.Key IS NULL Part (4) in FIG. 1 shows right join on the right side. When an SQL statement specifies that right join is to be performed on table A and table B, a returned result is all rows of table B. A data row whose key value is equal to that in table A includes a field value of a target field to be queried in table A, and a data row that is not matched with table A (having unequal keys) is shown by null in the target field. A form of the SQL statement that implements the operation is as follows:

SELECT<select_list>
FROM TableA
RIGHT JOIN TableB
ON A.Key=B.Key

Part (5) in FIG. 1 similarly shows right join that rules out the intersection. A form of an SQL statement that implements the operation is as follows:

SELECT<select_list>
FROM TableA
RIGHT JOIN TableB
ON A.Key=B.Key
WHERE A.Key IS NULL Part (6) in FIG. 1 shows full outer join. A form of an SQL statement that implements the operation is as follows:

SELECT<select_list>
FROM TableA
FULL OUTER JOIN TableB
ON A.Key=B.Key

Part (7) in FIG. 1 shows full outer join that rules out the intersection. A form of an SQL statement that implements the operation is as follows:

SELECT<select_list>
FROM TableA
FULL OUTER JOIN TableB
ON A.Key=B.Key
WHERE A.Key IS NULL
OR B.Key IS NULL Although not shown in FIG. 1, a cross join operation can also be used in the SQL. The SQL provides various join operations to perform various joint queries on a plurality of tables to satisfy various query demands of a SQL user.

Figure 2:
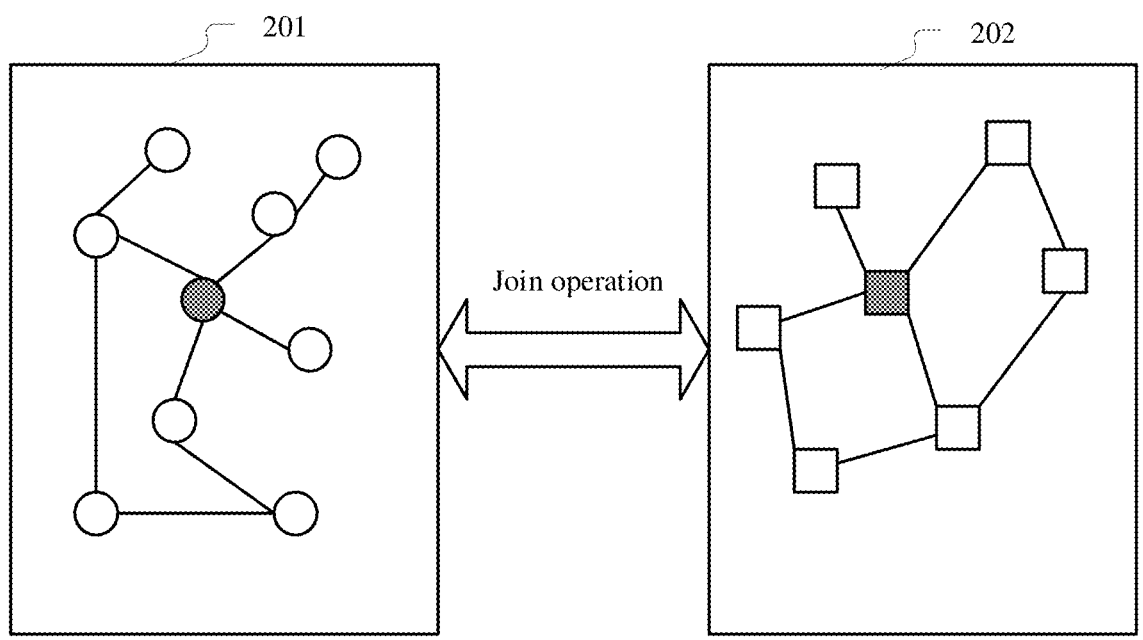
FIG. 2 is a schematic diagram illustrating joint query of graph data, according to some embodiments.

FIG. 2 is a schematic diagram illustrating joint query of graph data, according to some embodiments. In FIG. 2, it is assumed that graph 201 is a social relation graph, circular nodes represent persons, and connection edges between the circular nodes represent friend relations. A gray circular node represents a person, e.g., Amy, and an id of Amy is, for example, 1. In FIG. 2, graph 202 is a work relation graph, square nodes represent employees, and connection edges between the square nodes represent work relations or partnership. A gray square also represents Amy. Graph data of both graph 201 and graph 202 in FIG. 2 is stored in a graph database. For such graph data, there may be a query demand that a set is to be queried, where a person in the set is both a friend of a specific node (for example, Amy) and a working partner of the specific node. For such query, joint query can be performed on the graph data of graph 201 and graph 202 in FIG. 2, in other words, a join operation can be performed.

In related technologies, query languages and query engines such as Neo4j that can perform a "join operation" on graph data already exist. However, the query language in the related technologies are typically difficult for the SQL user to learn, to construct query statements. In addition, the existing query language does not support directly and explicitly defining different join types such as inner join or left join, which further increases the difficulty of performing joint query on graph data in a graph database.

In view of the above, embodiments of the present specification provide a graph data query method and apparatus, to support directly specifying a join type for graph data query in a graph database, thereby facilitate performing a join operation and joint query on graph data of a plurality of graphs in the graph database.

Figure 3:
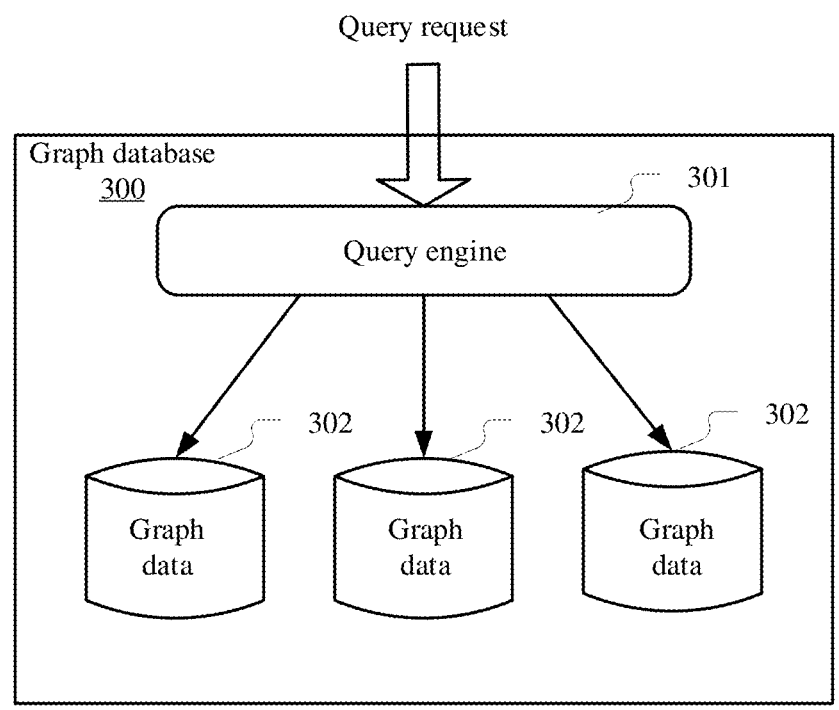
FIG. 3 is a schematic diagram illustrating graph data query in a graph database, according to some embodiments.

FIG. 3 is a schematic diagram illustrating graph data query in a graph database 300, according to some embodiments. As shown in FIG. 3, the graph database 300 includes a query engine 301 and a data storage area 302 for graph data. The data storage area 302 can store graph data of various graphs, and the query engine 301 provides an external interface, receives a query request of a user, and queries the data storage area 302 for data based on the query request. According to some embodiments of the present specification, an improved query engine is provided. The query engine 301 can support a query statement in an SQL-like form, which is also referred to as a graph query language (GQL) statement. The GQL statement can support a join operation between two or more graphs and support direct definition of a join type. Correspondingly, the query engine 301 can parse the GQL statement, determine a join type defined in the GQL statement, and perform, based on the join type, a corresponding join operation on graph data specified in the GQL.

Figure 4:
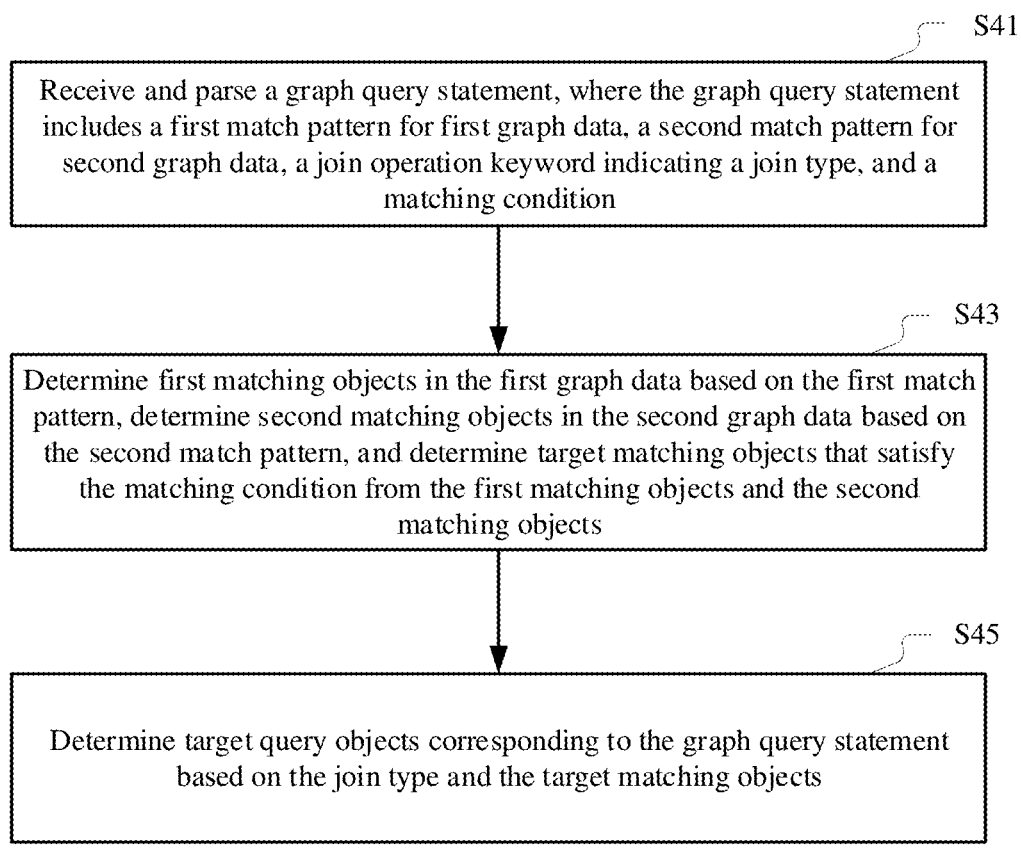
FIG. 4 is a flowchart illustrating a graph data query method, according to some embodiments.

FIG. 4 is a flowchart illustrating a graph data query method, according to some embodiments. The query method may be performed by a query engine deployed in a graph database, such as the query engine 301 in the graph database 300 (FIG. 3). The query engine and the graph database can be implemented by any apparatus, device, platform, or device cluster that has computing, storage, and processing capabilities. As shown in FIG. 4, the query method includes the following steps: Step S41: Receive and parse a graph query statement for the graph database, where the graph query statement includes a first match pattern for first graph data, a second match pattern for second graph data, a join operation keyword indicating a join type, and a matching condition. Step S43: Determine one or more first matching objects in the first graph data based on the first match pattern, determine one or more second matching objects in the second graph data based on the second match pattern, and determine one or more target matching objects that satisfy the matching condition from the first matching objects and the second matching objects. Step S45: Determine one or more target query objects corresponding to the graph query statement based on the join type and the target matching objects, thereby performing a graph data query in the graph database. The following describes in detail an example execution process of the above steps.

In step S41, the query engine receives the graph query statement and parses the graph query statement. The graph query statement is a GQL statement, and includes the first match pattern for the first graph data, the second match pattern for the second graph data, the join operation keyword indicating the join type, and the matching condition.

The GQL statement can be query operation statements of various statement types, for example, a select statement that returns a query result, or can be a statement for performing an operation on data, for example, a delete statement for deleting data or an update statement for updating data.

The select statement is used as an example. In an embodiment, the select query statement in the GQL format can have the following general form:

SELECT . . . MATCH PATTERN1 xx JOIN MATCH PATTERN2 ON . . . (WHERE . . . )

MATCH PATTERN1 defines the first match pattern for the first graph data, and MATCH PATTERN2 defines the second match pattern for the second graph data. Because elements in graph data are richer and more complex, a matching method for graph data is defined here by using the match pattern, for example, node matching, edge matching, or path matching. Generally, for validity of a query result, the first match pattern and the second match pattern are corresponding match patterns.

In the above general form, xx JOIN is the join operation keyword, and xx in xx JOIN directly indicates the join type. In other words, xx JOIN can be, e.g., inner join, left join, right join, etc. ON and optional WHERE in the general form define the matching condition.

In some embodiments, a GQL statement in an operation can be case-insensitive, and uppercase and lowercase statement instructions have a same meaning and function.

For such a query statement, the query engine can perform corresponding parsing on the query statement, and extract query elements such as a match pattern, a join type, and a matching condition from the query statement.

In step S43, the first matching objects in the first graph data are determined based on the first match pattern, the second matching objects in the second graph data are determined based on the second match pattern, and the target matching objects that satisfy the matching condition are determined from the first matching objects and the second matching objects.

For example, when the first/second match pattern is node matching, a first node set can be retrieved from the first graph data based on the first match pattern, a second node set can be retrieved from the second graph data based on the second match pattern, and one or more nodes are determined from the first node set and the second node set based on the matching condition, and used as the target matching objects. Generally, the one or more nodes used as the target matching objects are an intersection of the first node set and the second node set that satisfies the matching condition.

Also for example, when the first/second match pattern is edge matching or path matching, the obtained first matching objects can be a first edge set or a first path set in the first graph data, and the second matching objects can be a second edge set or a second path set in the second graph data. Correspondingly obtained target matching objects can be one or more edges or paths that satisfy the matching condition and serve as an intersection.

In step S45, the query engine determines the target query objects corresponding to the graph query statement based on the join type indicated by the join operation keyword and the target matching objects.

As described above, the target matching object is usually an intersection object of the first matching objects and the second matching objects that satisfies the matching condition. A final query result depends on a query object and the join type that are specified in the query statement.

For example, if the join operation keyword is INNER JOIN, and the indicated join type is inner join, a query object corresponding to the target matching object (the intersection) is determined as the target query object of the GQL statement. If the join type is left join, a first subset in the first matching objects that does not belong to the target matching objects is marked by using a predetermined character (for example, null), and the target query objects are determined based on marked first matching objects. If the join type is right join, a second subset in the second matching objects that does not belong to the target matching objects is marked by using a predetermined character, and the target query objects are determined based on marked second matching objects. For another join type, the query engine can determine the target query objects based on the join type and the target matching objects with reference to join logic of various join operations defined in the SQL.

When the target query objects are determined, a corresponding data processing operation can be performed on the target query objects based on a statement type of the GQL graph query statement.

For example, if the statement type of the GQL statement is the above select statement, the data processing operation here is obtaining and returning target attribute item information of the target query objects specified in the select statement. If the GQL statement is a delete statement, the data processing operation on the query objects can include: deleting related information of the target query objects from the first graph data and/or the second graph data. If the statement type of the GQL statement is an update statement, the data processing operation on the query objects includes: updating the target attribute item information of the target query objects.

The following describes the above query process with reference to an example of the graph data shown in FIG. 2.

It is assumed that join query is currently needed between the social relation graph 201 and the working relation graph 202 in FIG. 2. In some examples, the social relation graph 201 and the working relation graph 202 include the following metadata information.

In the social relation graph 201, each node represents and is referred to as person, and each person node has a plurality of attributes such as age, name, and rank. Connection edges between the person nodes represent friend relations, denoted by friend_relation. The connection edges are non-directional edges and have an intimacy attribute.

In the working relation graph 202, each node represents an employee and is referred to as employ, and each employ node has a plurality of attributes such as name and salary. Connection edges between the employ nodes represent work relations, denoted as work_relation. The connection edges are non-directional edges and have a years-of-working-together attribute.

Based on the above information, the following multiple example GQL statements can be used to perform joint query on the social relation graph 201 and the working relation graph 202 in FIG. 2.

Example GQL statement 1 is:
SELECT p.name, p.age, e.salary MATCH (p: person) INNER JOIN MATCH (e: employ) ON p.id=e.id A statement type of GQL statement 1 is a select statement. The first match pattern (p: person) defines performing matching on the person nodes in the social relation graph 201, and the second match pattern (e: employ) defines performing matching on the employ nodes in the working relation graph 202. The join operation keyword is INNER JOIN, indicating inner join. The matching condition is p.id=e.id, that is, ids of nodes in the two graphs are equal.

For the GQL statement, the query engine determines, based on the first match pattern, that the first matching objects are the person nodes in the social relation graph 201, determines, based on the second match pattern, that the second matching objects are the employ nodes in the working relation graph 202, and determines nodes with equal ids as target matching objects, namely, intersection nodes in the social relation graph 201 and the working relation graph 202. Because the join type is inner join, and a query object is node, the intersection nodes can be determined as the target query objects. Because the statement is a select statement, the query engine returns specified attribute items of the target query objects, that is, attributes name and age of the person node and an attribute salary of the employ node.

Example GQL statement 2 is:
DELETE p MATCH (p: person) INNER JOIN MATCH (e: employ) ON p.id=e.id A statement type of GQL statement 2 is a delete statement. Query elements other than the statement type are the same as those in statement 1. Therefore, the target query objects are the same as above, and are the intersection nodes of the two graphs. Because the statement is a delete statement, the query engine deletes the intersection nodes from the social relation graph 201 and the working relation graph 202.

Example GQL statement 3 is:
UPDATE p.hobby='UnKnown' MATCH (p: person) INNER JOIN MATCH (e: employ) ON p.id=e.id A statement type of GQL statement 3 is an update statement. Query elements other than the statement type are the same as those in statement 1. Therefore, the target query objects are the same as above, and are the intersection nodes of the two graphs. Based on an update target specified by update, the query engine updates an attribute hobby of the intersection node in the social relation graph 201 to UnKnown.

Example GQL statement 4 is:
SELECT r1.dst_id MATCH (p: person {id: 1})-[r1: friend_relation]->(m1)
INNER JOIN MATCH (e: employ {id: 1})-[r2: work_relation]->(m2)
ON r1.dst_id=r2.dst_id A statement type of GQL statement 4 is a select statement. The match pattern is edge matching. The first match pattern defines performing matching by using a person node with id 1 in the social relation graph 201 as an endpoint and along edge r1 of the friend_relation type. The second match pattern defines performing matching by using an employ node with id 1 in the working relation graph 202 and along edge r2 of the work_relation type. The join operation keyword is INNER JOIN, indicating inner join. The matching condition is r1.dst_id=r2.dst_id, that is, ids of other-end endpoint nodes of edge r1 and edge r2 are equal.

For the GQL statement, the query engine determines, based on the first match pattern, that the first matching objects are a first edge set using a person node with id 1 as a starting point in the social relation graph 201, determines, based on the second match pattern, that the second matching objects are a second edge set using an employ node with id 1 as a starting point in the working relation graph 202, and determines, from the two edge sets, one or more intersection edges whose destination points have equal ids. Because the join type is inner join, and the query object is a node (r1.dst indicates a destination node of edge r1), destination nodes of the intersection edges can be determined as the target query objects. Because the statement is a select statement, the query engine returns specified information items of the target query objects, that is, node ids of the destination nodes of the intersection edges.

With reference to FIG. 2, it can be understood that if a node with id=1 corresponds to Amy, GQL statement 4 can be used to query the social relation graph 201 and the working relation graph 202 for a person (identified by an id) who is both a friend (a node that edge r1 points to) of Amy and a colleague (a node that edge r2 points to) of Amy.

If a person who is only a friend but not a colleague in friends of Amy needs to be queried, the following example GQL statement 5 can be used:
SELECT r1.dst_id MATCH (p: person {id: 1})-[r1: friend_relation]->(m1)
LEFT JOIN MATCH (e: employ {id: 1})-[r2: work_relation]->(m2)
ON r1.dst_id=r2.dst_id WHERE r2.dst_id=NULL Both a statement type and a match pattern of GQL statement 5 are the same as those of statement 4. Differently, a join type defined in statement 5 is left join, and a where clause is used to limit the left join to left join that rules out the intersection.

For the GQL statement, the query engine can determine that the first matching objects are a set of first edges connected to Amy (a node with id=1) in the social relation graph 201, and that target matching objects are intersection edges whose one-end nodes are Amy (id=1) and other-end nodes have a same id, and mark, by using a predetermined character (for example, null) based on a property of left join, edges in the first edge set that do not belong to the intersection edges. Because the where clause defines further querying edges with the null character (in other words, ruling out the intersection edges), final target query objects are destination nodes of the target edges that do not belong to the intersection edges. Therefore, the query engine returns node ids of the destination nodes of the target edges, that is, ids of friend nodes in friends of Amy that do not belong to the intersection of the two graphs.

Similarly, if a person who is only a colleague but not a friend in colleagues of Amy needs to be queried, right join can be performed on the social relation graph 201 and the working relation graph 202. Details are omitted here for simplicity.

If operation processing needs to be performed on the intersection edges of the two graphs, the following example GQL statement 6 can be used:
UPDATE r1.intimacy=100
MATCH (p: person {id: 1})-[r1:friend_relation]->(m1)
INNER JOIN
MATCH (e: employ {id: 1})-[r2:work_relation]->(m2)
ON r1.dst_id=r2.dst_id Query elements of GQL statement 6 are similar to those of GQL statement 4, except that a specified query object of GQL statement 6 is an edge, and correspondingly obtained target query objects are intersection edges whose one-end nodes are Amy (id=1) and other-end nodes have equal ids in the social relation graph 201 and the working relation graph 202. A statement type of GQL statement 6 is an update statement. Based on an object of update, the query engine updates an attribute value of the intimacy attribute of the target query object (namely, the intersection edge) to 100 in the social relation graph 201.

Similarly, a delete operation can be performed on the target query objects obtained through edge matching. Details are omitted here for simplicity.

In addition, the GQL can also support path-based query. Corresponding example GQL statement 7 is:

SELECT m1.name, m1.age
MATCH (p: person {id: 1})-[r1:friend_relation]-> . . . ->(m1)
INNER JOIN
MATCH (e: employ {id: 1})-[r2: work_relation]-> . . . ->(m2)
ON m1.id=m2.id A statement type of GQL statement 7 is a select statement. In the GQL statement, the first match pattern defines a first path along an edge friend_relation starting from a person node with id 1 in the social relation graph 201, and a destination node of the first path is denoted as m1. The first path can include one or more edges, indicated by an ellipsis in the above statement. Correspondingly, the second match pattern defines a second path along an edge work_relation starting from an employ node with id 1 in the working relation graph 202. The join operation keyword is INNER JOIN, indicating inner join. The matching condition is m1.id=m2.id, that is, destination nodes of the first path and the second path have equal ids.

For the GQL statement, the query engine determines, based on the first match pattern, that the first matching objects are a set of first paths in the social relation graph 201, determines, based on the second match pattern, that the second matching objects are a set of second paths in the working relation graph 202, and determines paths whose destination nodes have equal ids as target matching objects, namely, intersection paths in the social relation graph 201 and the working relation graph 202. Because the join type is inner join, and a query object is a node, the target query object can be determined as a destination node of the intersection path in the social relation graph 201. Therefore, the query engine can return specified information items of the target query object, that is, attributes name and age of node m1.

Similarly, an update/delete operation can be performed on the target query object obtained through path matching by using an update statement/delete statement. Details are omitted here for simplicity.

For a plurality of graph data query demands, examples of GQL statements and corresponding query processes of the query engine are described above. It can be understood that based on the above examples, a person skilled in the art can write other GQL statements that satisfy query demands for different match patterns, different join types, and different matching conditions.

In addition, expression forms of the match pattern and the match condition can have other variations. For example, the introductory word MATCH of the match pattern is omitted, or an edge or a path is represented in a different form. For the join operation keyword, the join type is directly indicated.

Figure 5:
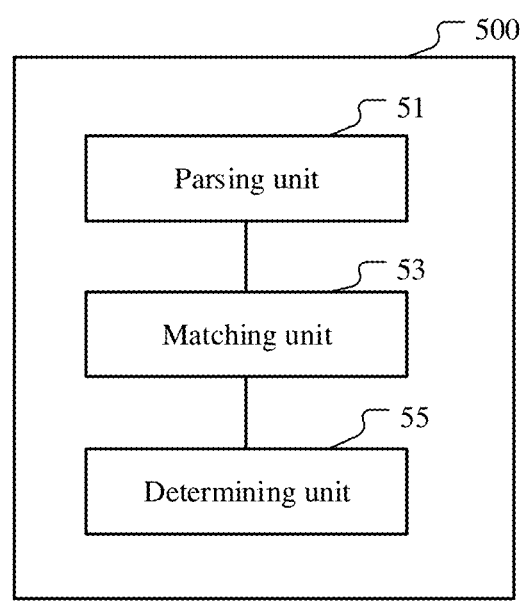
FIG. 5 is a schematic diagram illustrating a graph data query apparatus, according to some embodiments.

FIG. 5 is a schematic diagram illustrating a graph data query apparatus 500, according to some embodiments. The apparatus 500 can be deployed as a query engine in any device, platform, or device cluster that has data storage, computing, and processing capabilities. The apparatus 500 can be implemented with hardware, software, or a combination thereof. As shown in FIG. 5, the apparatus 500 includes: a parsing unit 51, a matching unit 53, and a determining unit 55. The parsing unit 51 is configured to receive and parse a graph query statement, where the graph query statement includes a first match pattern for first graph data, a second match pattern for second graph data, a join operation keyword indicating a join type, and a matching condition. The matching unit 53 is configured to determine first matching objects in the first graph data based on the first match pattern, determine second matching objects in the second graph data based on the second match pattern, and determine target matching objects that satisfy the matching condition from the first matching objects and the second matching objects. The determining unit 55 is configured to determine target query objects corresponding to the graph query statement based on the join type and the target matching objects.

In some embodiments, the join type indicated by the join operation keyword is inner join, and the determining unit 55 is configured to determine query objects corresponding to the target matching objects as the target query objects.

In some other embodiments, the join type indicated by the join operation keyword is left join, and the determining unit 55 is configured to mark, by using a predetermined character, a first subset in the first matching objects that does not belong to the target matching objects, and determine the target query objects based on marked first matching objects.

In some other embodiments, the join type indicated by the join operation keyword is right join, and the determining unit 55 is configured to mark, by using a predetermined character, a second subset in the second matching objects that does not belong to the target matching objects, and determine the target query objects based on marked second matching objects.

In some embodiments, the first match pattern can include node matching, edge matching, or path matching.

In some embodiments, the first match pattern is edge matching using a first node as an endpoint, and the matching unit 53 is configured to query the first graph data for the first node, and determine one or more edges by using the first node as an endpoint; and determine each of the one or more edges or the other endpoint of each of the one or more edges as the first matching object.

In some embodiments, the apparatus 500 further includes a data processing unit (not shown), configured to perform a data processing operation on the target query objects based on a statement type of the graph query statement.

In some embodiments, the statement type of the graph query statement is a select statement, and the data processing unit is configured to obtain and return target information items of the target query objects.

In some embodiments, the statement type of the graph query statement is a delete statement, and the data processing unit is configured to delete related information of the target query objects from the first graph data and/or the second graph data.

In some embodiments, the statement type of the graph query statement is an update statement, and the data processing unit is configured to update target attribute item information of the target query objects.

Embodiments of the specification also provide a non-transitory computer-readable storage medium. The computer-readable storage medium stores instructions that, when executed by a processor, cause the processor to perform the graph data query method described above.

Figure 6:
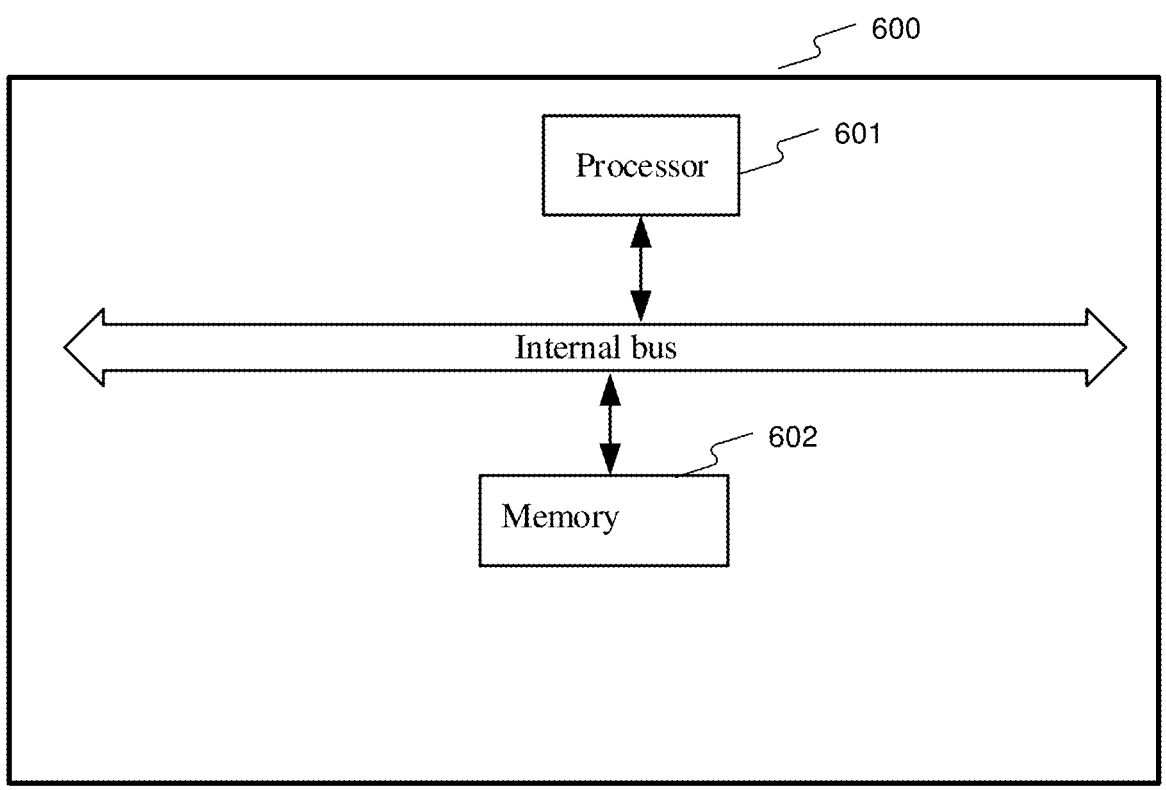
FIG. 6 is a schematic diagram illustrating a graph data query apparatus, according to some embodiments.

FIG. 6 is a schematic diagram illustrating a graph data query apparatus 600, according to some embodiments. The graph data query apparatus 600 includes a processor 601, and a memory 602 storing instructions executable by the processor 601. The processor 601 is configured to perform the graph data query method described above.

The foregoing describes example embodiments of the present specification, which are not intended to limit the present specification. For those skilled in the art, the present specification may have various alterations and changes. Any modification, equivalent replacement, improvement, and the like made within the spirit and principle of the present specification are included in the scope of the claims of the present specification.

The invention claimed is:

1. A graph data query method for use in a graph database, the method comprising:
receiving and parsing a graph query statement for the graph database, wherein the graph query statement comprises a first match pattern for first graph data, a second match pattern for second graph data, a join operation keyword indicating a join type, and a matching condition;
determining one or more first matching objects in the first graph data based on the first match pattern, determining one or more second matching objects in the second graph data based on the second match pattern, and determining one or more target matching objects that satisfy the matching condition from the first matching objects and the second matching objects; and
determining one or more target query objects corresponding to the graph query statement based on the join type and the target matching objects, thereby performing a graph data query in the graph database.

2. The method according to claim 1, wherein the join type indicated by the join operation keyword is inner join, and a target query object is a query object corresponding to a target matching object.

3. The method according to claim 1, wherein the join type indicated by the join operation keyword is left join, and determining the one or more target query objects corresponding to the graph query statement comprises:
marking, by using a predetermined character, a first subset in the first matching objects that does not belong to the target matching objects, and determining the target query objects based on marked first matching objects.

4. The method according to claim 1, wherein the join type indicated by the join operation keyword is right join, and determining the one or more target query objects corresponding to the graph query statement comprises:
marking, by using a predetermined character, a second subset in the second matching objects that does not belong to the target matching objects, and determining the target query objects based on marked second matching objects.

5. The method according to claim 1, wherein the first match pattern comprises at least one of node matching, edge matching, or path matching for the graph database.

6. The method according to claim 5, wherein the first match pattern is edge matching using a first node in the graph database as an endpoint, and determining the one or more first matching objects in the first graph data based on the first match pattern comprises:
querying the first graph data for the first node in the graph database, and determining one or more edges in the graph database by using the first node as an endpoint; and
determining each of the one or more edges or another endpoint of each of the one or more edges as a first matching object.

7. The method according to claim 1, further comprising:
performing a data processing operation on the target query objects based on a statement type of the graph query statement.

8. The method according to claim 7, wherein the statement type of the graph query statement is a select statement, and performing the data processing operation on the target query objects comprises:
obtaining and returning target information items of the target query objects.

9. The method according to claim 7, wherein the statement type of the graph query statement is a delete statement, and performing the data processing operation on the target query objects comprises:
deleting related information of the target query objects from at least one of the first graph data or the second graph data.

10. The method according to claim 7, wherein the statement type of the graph query statement is an update statement, and performing the data processing operation on the target query objects comprises:
updating target attribute item information of the target query objects.

11. A graph data query apparatus for use in a graph database, the apparatus comprising:
a processor; and
a memory storing instructions executable by the processor,
wherein the processor is configured to:
receive and parse a graph query statement for the graph database, wherein the graph query statement comprises a first match pattern for first graph data, a second match pattern for second graph data, a join operation keyword indicating a join type, and a matching condition;
determine one or more first matching objects in the first graph data based on the first match pattern, determine one or more second matching objects in the second graph data based on the second match pattern, and determine one or more target matching objects that satisfy the matching condition from the first matching objects and the second matching objects; and
determine one or more target query objects corresponding to the graph query statement based on the join type and the target matching objects, thereby performing a graph data query in the graph database.

12. The apparatus according to claim 11, wherein the join type indicated by the join operation keyword is inner join, and a target query object is a query object corresponding to a target matching object.

13. The apparatus according to claim 11, wherein the join type indicated by the join operation keyword is left join, and in determining the one or more target query objects corresponding to the graph query statement, the processor is further configured to:
mark, by using a predetermined character, a first subset in the first matching objects that does not belong to the target matching objects, and determine the target query objects based on marked first matching objects.

14. The apparatus according to claim 11, wherein the join type indicated by the join operation keyword is right join, and in determining the one or more target query objects corresponding to the graph query statement, the processor is further configured to:
mark, by using a predetermined character, a second subset in the second matching objects that does not belong to the target matching objects, and determine the target query objects based on marked second matching objects.

15. The apparatus according to claim 11, wherein the first match pattern comprises at least one of node matching, edge matching, or path matching for the graph database.

16. The apparatus according to claim 15, wherein the first match pattern is edge matching using a first node in the graph database as an endpoint, and in determining the one or more first matching objects in the first graph data based on the first match pattern, the processor is further configured to:
query the first graph data for the first node in the graph database, and determine one or more edges in the graph database by using the first node as an endpoint; and
determine each of the one or more edges or another endpoint of each of the one or more edges as a first matching object.

17. The apparatus according to claim 11, wherein the processor is further configured to:
perform a data processing operation on the target query objects based on a statement type of the graph query statement.

18. The apparatus according to claim 17, wherein the statement type of the graph query statement is a select statement, and in performing the data processing operation on the target query objects, the processor is further configured to:
obtain and return target information items of the target query objects.

19. The apparatus according to claim 17, wherein the statement type of the graph query statement is a delete statement, and in performing the data processing operation on the target query objects, the processor is further configured to:
delete related information of the target query objects from at least one of the first graph data or the second graph data.

20. The apparatus according to claim 17, wherein the statement type of the graph query statement is an update statement, and in performing the data processing operation on the target query objects, the processor is further configured to:
update target attribute item information of the target query objects.

* * * * *